UNITED STATES PATENT OFFICE.

JOHN B. SCOTT, OF HYATTSVILLE, ASSIGNOR TO HIMSELF, GEO. HALL, OF PRINCE GEORGE'S COUNTY, AND S. MOSS, OF BALTIMORE, MARYLAND.

IMPROVED BURNING-FLUID.

Specification forming part of Letters Patent No. 58,180, dated September 18, 1866.

*To all whom it may concern:*

Be it known that I, JOHN B. SCOTT, of Hyattsville, in the county of Prince George's and State of Maryland, have discovered certain new and useful Improvements in Burning-Fluid; and I do hereby declare that the following is a full, clear, and exact description of the manner of compounding or manufacturing the same.

I use for making this fluid the following ingredients, in the following proportions: forty (40) gallons of naphtha, fifty (50) pounds potatoes, four (4) pounds of lime, four (4) pounds soda, and three (3) pounds curcuma. These should be placed in a vessel, well stirred, and allowed to remain forty-eight (48) hours. The fluid should then be strained, and it is ready for use.

The potatoes are used raw, and should either be mashed or cut into small pieces. The lime should be slaked with only sufficient water to slake it, leaving a dry powder.

By this combination of ingredients I am enabled to make as good an article of burning-fluid as is now known, and at a very small cost.

What I claim as new, and desire to secure by Letters Patent, is—

The use of the above-described ingredients, compounded as and for the purpose herein specified.

As evidence that I claim the foregoing I have hereunto set my hand in the presence of two witnesses.

JOHN B. SCOTT.

Witnesses:
C. M. ALEXANDER,
J. M. WALKER.